United States Patent [19]

Wyeth et al.

[11] Patent Number: 4,798,467
[45] Date of Patent: Jan. 17, 1989

[54] HETERODYNE LASER INSTANTANEOUS FREQUENCY MEASUREMENT SYSTEM

[75] Inventors: Richard W. Wyeth, Livermore; Michael A. Johnson, Pleasanton; Michael A. Globig, Livermore, all of Calif.

[73] Assignee: The United States Department of Energy, Washington, D.C.

[21] Appl. No.: 911,023

[22] Filed: Sep. 24, 1986

[51] Int. Cl.⁴ .............................................. G01B 9/02
[52] U.S. Cl. ...................................... 356/349; 372/32
[58] Field of Search ...................... 356/349, 346, 351; 372/32

[56] References Cited

U.S. PATENT DOCUMENTS

| | | | |
|---|---|---|---|
| 3,939,342 | 2/1976 | Bezerie et al. | 356/349 X |
| 3,950,100 | 4/1976 | Keene et al. | 356/28 |
| 4,190,362 | 2/1980 | Dubrunfant | 356/5 |
| 4,272,193 | 6/1981 | Eastman et al. | 356/349 |
| 4,325,635 | 4/1982 | Sattler et al. | 356/349 |
| 4,668,093 | 5/1987 | Cahill | 356/345 |

FOREIGN PATENT DOCUMENTS 2164221 3/1986 United Kingdom .

OTHER PUBLICATIONS

Burghardt et al., "Beat frequency . . . 80-GHz Band", Applied Phys. Lett. vol. 35, No. 7, Oct. 1979, pp. 498–500.
DeGraauw et al., "A Single-sideband Optical Balanced Mixed", Optics Communications, vol. 14, No. 2, Jun. 1975, pp. 276–279.

Primary Examiner—Eugene R. Laroche
Assistant Examiner—Seung Ham
Attorney, Agent, or Firm—P. Martin Simpson, Jr.; L. E. Carnahan; Judson R. Hightower

[57] ABSTRACT

A heterodyne laser instantaneous frequency measurement system is disclosed. The system utilizes heterodyning of a pulsed laser beam with a continuous wave laser beam to form a beat signal. The beat signal is processed by a controller or computer which determines both the average frequency of the laser pulse and any changes or chirp of th frequency during the pulse.

8 Claims, 5 Drawing Sheets

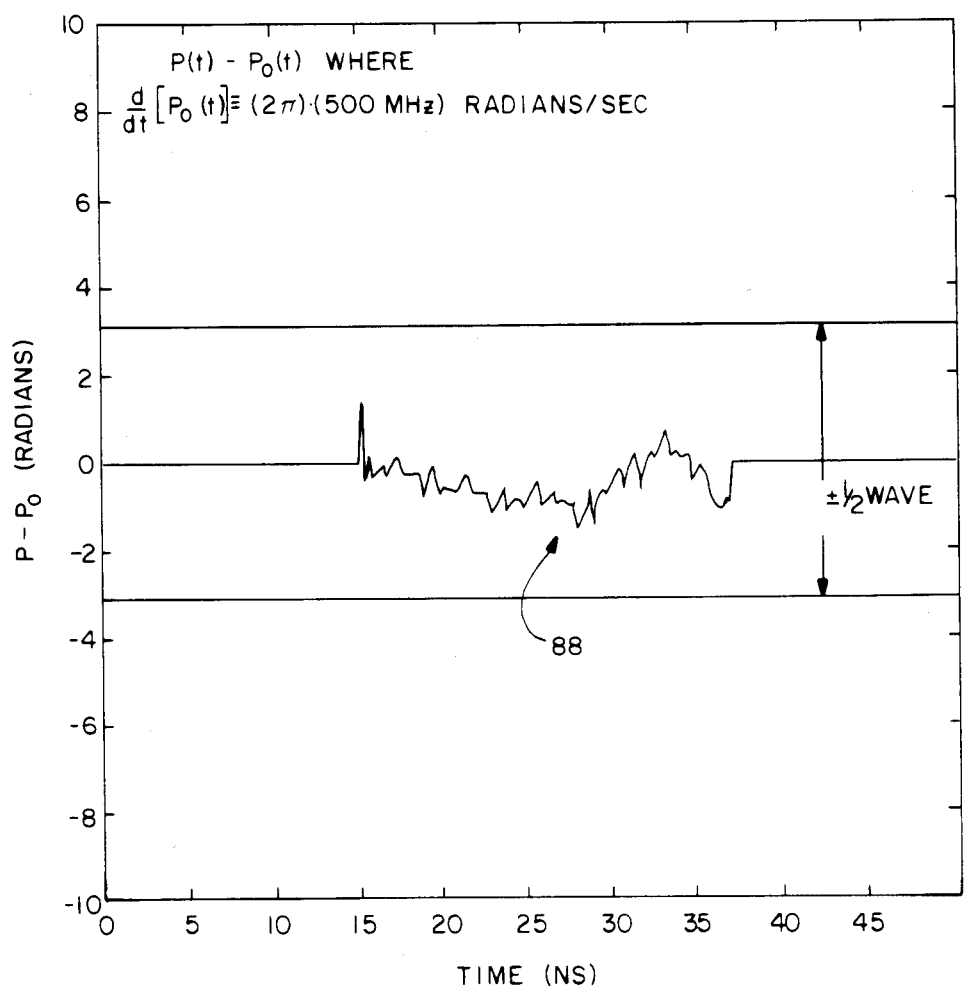
FIG. — 2B

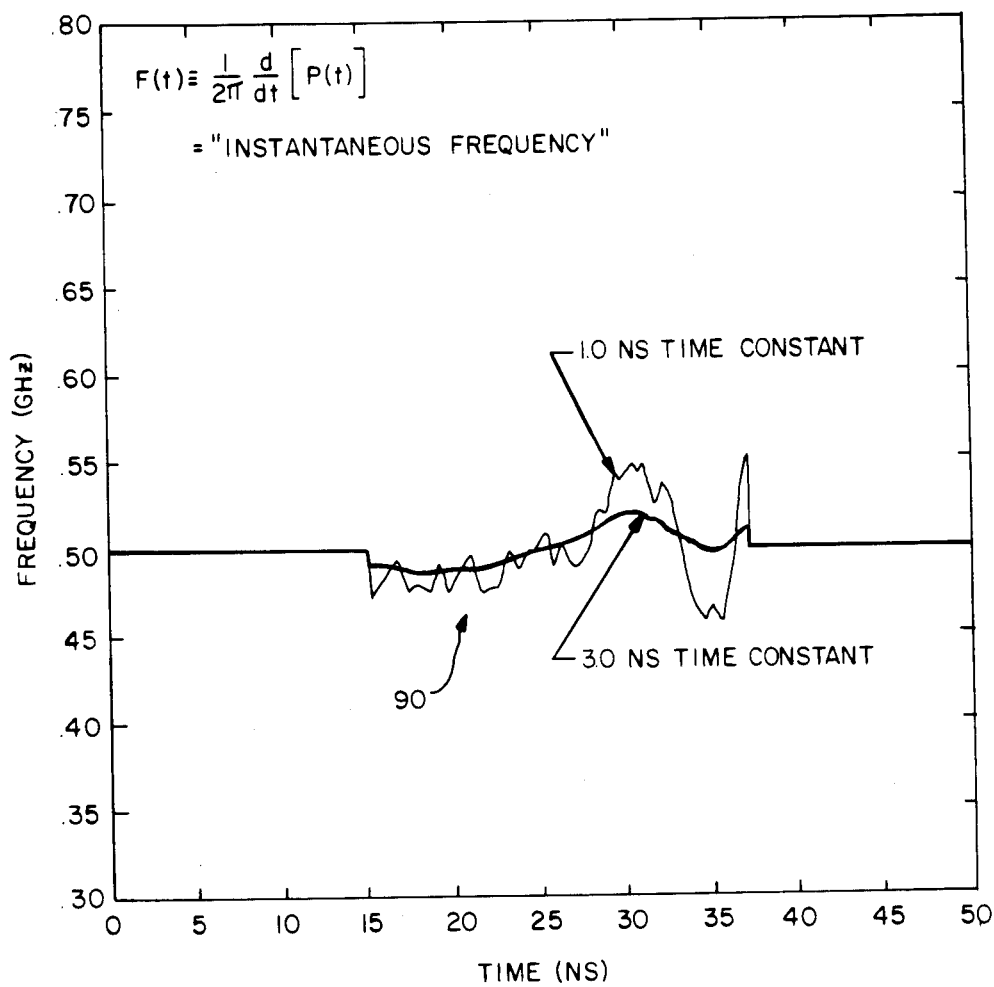
FIG. — 2C

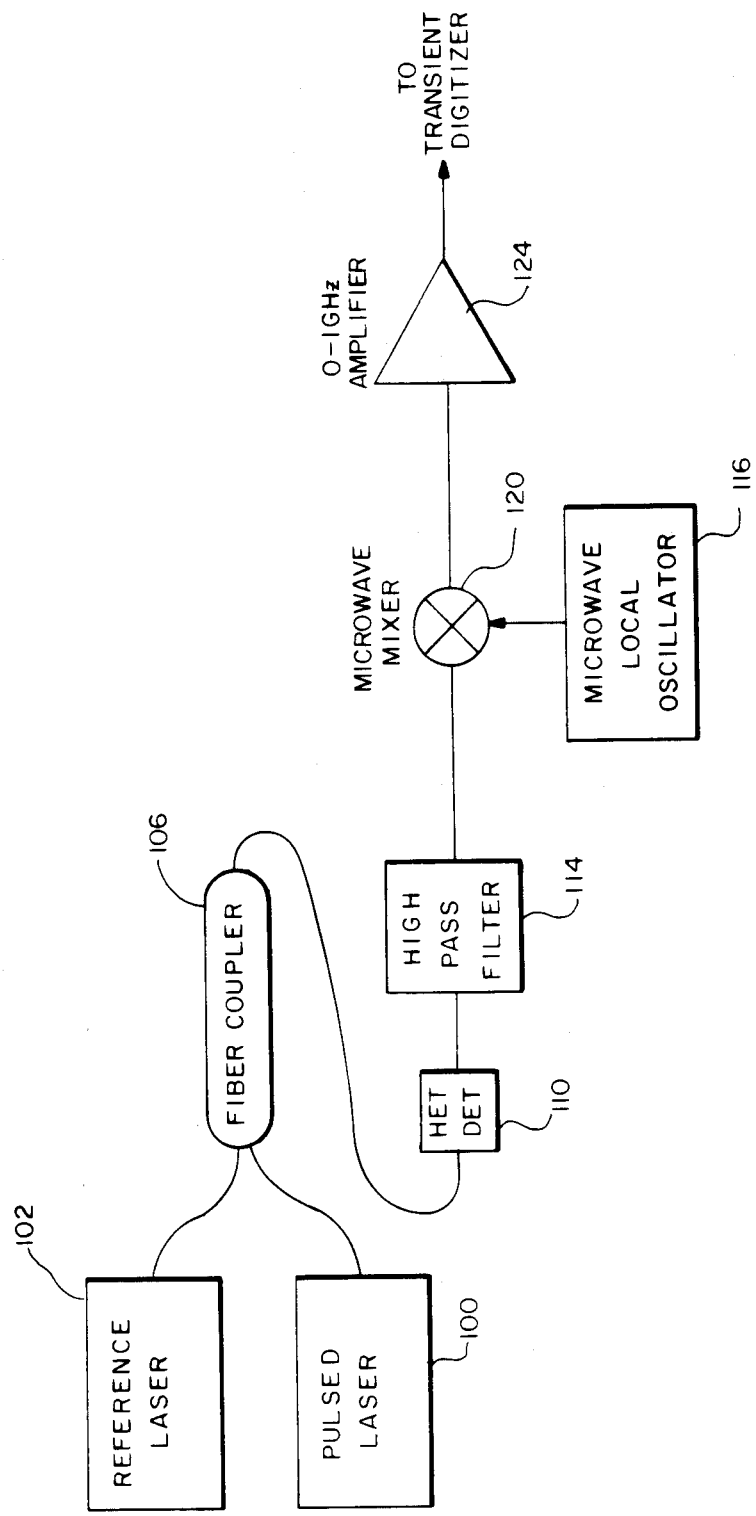
FIG.—3

HETERODYNE LASER INSTANTANEOUS FREQUENCY MEASUREMENT SYSTEM

FIELD OF THE INVENTION

The United States Government has rights in this invention pursuant to Contract No. W-7405-ENG-48 between the United States Department of Energy and the University of Californiz for the operation of Lawrence Livermore National Laboratory.

BACKGROUND OF THE INVENTION

The present invention relates to a heterodyne laser instantaneous frequency measurement system.

In one preferred embodiment, the present invention is intended for use in an atomic vapor laser isotope separation (AVLIS) process which utilizes pulsed laser beams for photoionizing an atomic vapor. Optimum operation of an AVLIS process requires precise control of the frequency of the pulsed lasers used in the process. The isotope frequency shift and hyperfine splittings of optical transitions in heavy atoms are typically between 0.1 and 10 GHz. Hyperfine spectral features can have line widths of less than 10 MHz in atomic beams to more than one GHz in thermal sources. The efficiency of such a process is often dependent upon accurately placing the laser frequency on the center line of the hyperfine spectral features, requiring an absolute frequency error of less than 5 MHz. For 500 THz red light, this corresponds to a maximum fractional frequency error of one part in $10^8$.

In view of the above background, it would clearly be desirable to provide for a frequency measurement system which is capable of providing an accurate indication of the instantaneous frequency of a pulsed laser beam.

SUMMARY OF THE INVENTION

It is an object of the present invention to provide an instantaneous frequency measurement system.

It is a more particular object of the present invention to provide a heterodyne laser instantaneous frequency measurement system which can determine the instantaneous frequency of a laser pulse.

It is a further object of the present invention to provide a system which can determine both the average frequency of a laser pulse and any changes or "chirp" of the frequency during the pulse.

Briefly, the laser beam frequency diagnostic system includes a first pulsed laser for generating a first pulsed laser beam, the instantaneous frequency of which is to be determined. The system further includes a seocnd continuous wave (CW) reference laser for generating a second laser beam having a predetermined frequency range.

The system further includes means for heterodyning the first and second laser beams to form a beat signal representative of the difference between said first and second frequencies.

The system also includes means for processing the beat signal to determine the instantaneous frequency of said first laser beam.

Additional objects, advantages and novel features of the present invention will be set forth in part in the decription which follows and in part become apparent to those skilled in the art upon examination of the following or may be learned by practice of the invention. The objects, advantages and features of the invention may be realized and attained by means of the instrumentalities and combinations particularly pointed out in the appended claims.

BRIEF DESCRIPTION OF THE DRAWINGS

The accompanying drawings, which are incorporated in and form a part of this specification, illustrate an embodiment of the invention and, together with the following detailed description, serve to explain the principles of the invention.

FIG. 2B depicts a timing waveform of relative phase variation of a pulsed laser from a constant laser frequency.

FIG. 2C depicts a timing waveform of an instantaneous optical difference frequency between a pulsed laser and a CW reference laser.

FIG. 3 depicts a diagram of a microwave mixer down conversion of an optical heterodyne beat signal according to the present invention.

DETAILED DESCRIPTION OF THE DRAWINGS

Reference will now be made in detail to a preferred embodiment of the invention, an example of which is illustrated in the accompanying drawings. While the invention will be described in conjunction with that preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
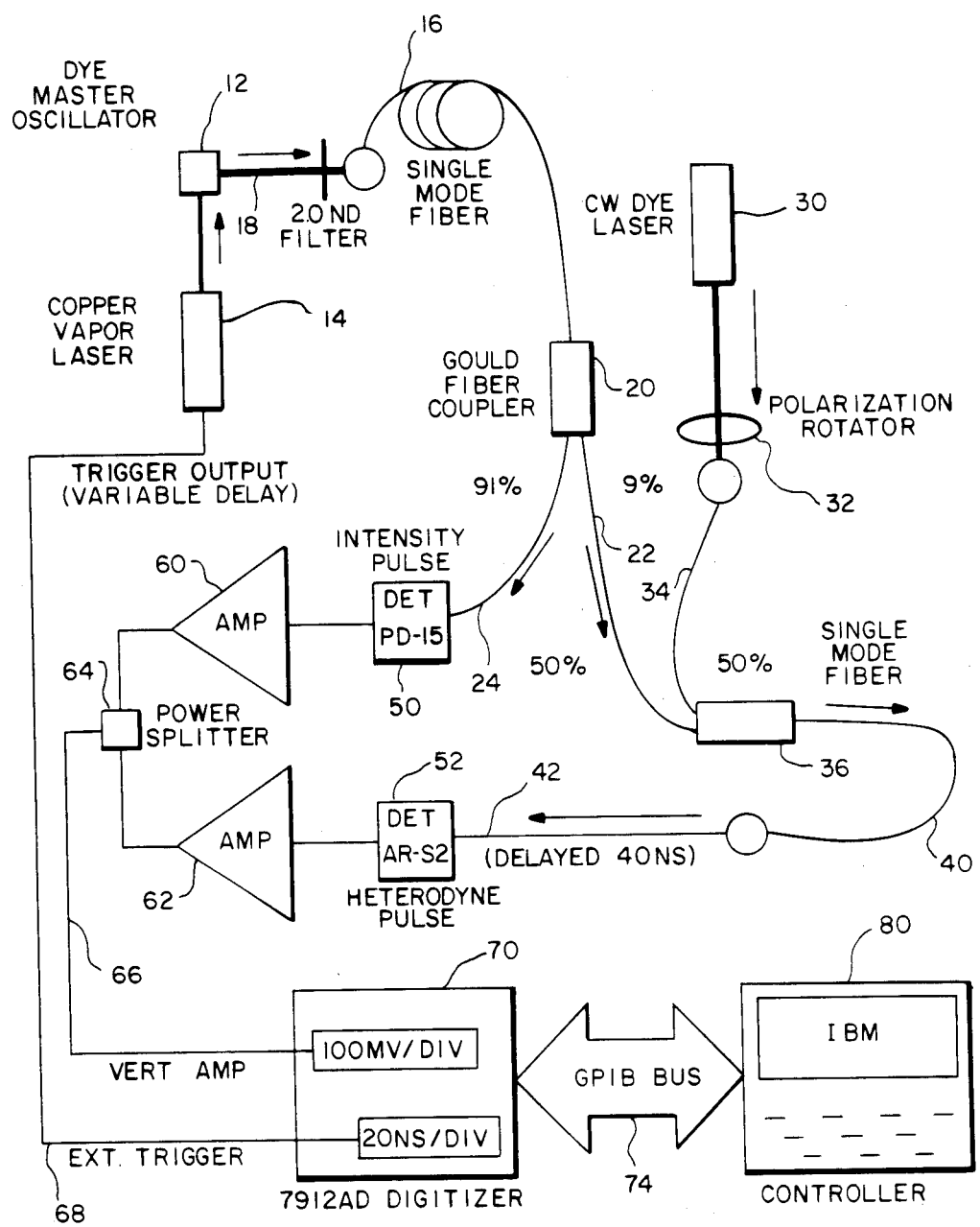
FIG. 1 depicts a block diagram of a pulsed laser heterodyne instantaneous frequency measurement system according to the present invention.

Referring now to FIG. 1, a block diagram of a laser heterodyne instantaneous frequency diagnostic system according to the present invention is depicted.

The laser heterodyne instantaneous frequency diagnostic system 10 can measure the absolute frequency of pulsed lasers as well as frequency variation of the laser during the pulse (as short as 10–100 nanoseconds pulse length). The diagnostic system 10 digitally records the heterodyne beat signal of the pulsed laser and a CW reference laser, which is at an appropriate known offset frequency. A computer than analyzes this data to calculate and plot instantaneous frequency versus time during the laser pulse. The system 10 measures absolute frequency offsets with an accuracy of better than 5 MHz and can detect frequency variations of about this same magnitude which occur in intervals as small as about 3 nanoseconds during the pulse.

Referring to the system 10 depicted in FIG. 1, a dye master oscillator 12 is suitably pumped by a copper vapor laser 14 in order to generate (or bring about the lasing) of a first laser beam 18, the frequency of which is to be calculated or determined by the system 10.

The pulsed laser beam 18 is optically coupled through a 2.0 ND (Neutral Density) filter to a single mode fiber 16, which is connected to a suitable coupler 20 (such as a Gould fiber coupler).

The copper vapor laser 14 also provides a trigger output on lead 68 for triggering purposes for digitizer 70, as will be described.

The first laser beam is proportionally split by coupler 20, 91% of which is input to detector 50, and 9% of which is input to combiner 36.

The system 10 also includes a continuous wave (CW) laser 30 having a predetermined offset frequency. The laser beam from CW laser 30 is input through a polarization rotator 32 to single mode fiber coupler 36.

The pulsed laser beams from pulsed laser 12 and the CW laser beam from laser 30 are combined onto a single mode fiber 40. The polarization rotator 32 is adjusted to align the two laser beam polarization at the detector 52 to achieve a maximum heterodyne beat signal.

In one embodiment, a 91% portion of a pulsed laser beam is input via fiber 24 to intensity pulse detector 50 and the combined pulsed/CW laser from fiber 20 is input to heterodyne pulse detector 52.

The outputs of detectors 50, 52 are input through signal combiner 64 on lead 66 to digitizer 70.

In FIG. 1, a silicon diode detector 52 with a linear relationship between incident light intensity and photocurrent increases the accuracy and time resolution of the instantaneous frequency calculations. The optical heterodyne difference-frequency is generally below 1 GHZ, so extremely high detector frequency response is not as important as the linearity of detector output current versus optical intensity. The heterodyne beat signal from detector 52 and the intensity amplitude waveform of the pulsed laser from detector 50 are both digitally recorded for the individual laser pulse under test, using a digitizer 70 (desirably a very fast Tektronix 7912AD Transient Digitizer). Since only one signal channel is available for real time analog to digital conversion by the transient digitizer 70, the heterodyne beat signal is delayed by either an electrical transmission or optical delay line 42 and then combined on the same signal line 66 as the pulsed laser amplitude waveform before input to the transient digitizer 70. If desired, a separate digitizer could be provided for the test signal and the heterodyne beat signal.

After analog to digital conversion by the transient digitizer 70, the digital data is transferred by a standard GPIB bus 74 to a computer (or controller) 80. The computer 80 then analyzes the combined beat signal and amplitude signal data to calculate the instantaneous optical difference frequency between the pulsed laser 12 and the CW laser reference 30.

The heterodyne data is first normalized using the pulsed laser amplitude data. Relative phase between the actual beat signal and an assumed constant frequency average beat signal is then calculated for the duration of the pulse. Finally, the derivative of the relative phase signal versus time is calculated. This result may be added to the assumed heterodyne frequency difference as well as the absolute frequency of the CW laser reference to yield the instantaneous optical frequency versus time. Absolute pulsed laser frequency and pulsed laser frequency changes which occur within a pulse are therefore obtained. Pulse to pulse frequency variations are quantified by repeating the measurement on additional laser pulses.

Figure 2A:
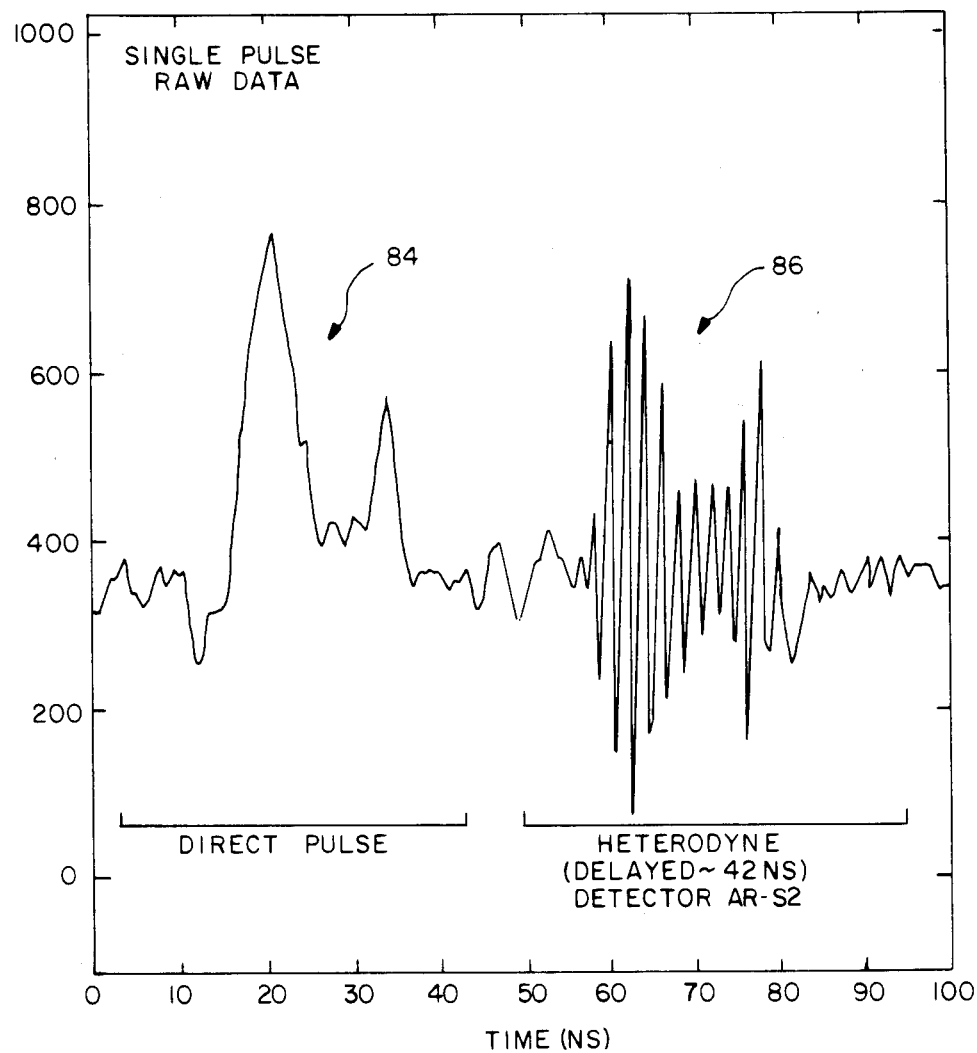
FIG. 2A depicts a timing waveform of pulsed laser amplitude and heterodyne beat signal data.

A plot obtained using the optical heterodyne system of the "instantaneous optical frequency" variation of a 20 nanosecond duration laser pulse appears in FIG. 2C. FIG. 2A shows the combined pulsed laser amplitude and heterodyne beat signal data that was captured by the transient digitizer 70 to obtain the plot of FIG. 2C. In FIG. 2A, curve 84 represents a single pulse from intensity pulse detector 50 of FIG. 1, and curve 86 represents the delayed heterodyne beat signal from heterodyne detector 52 of FIG. 1. The heterodyne signal is delayed by about 42 ns. FIG. 2B is a plot of an intermediate computer result showing the relative phase variation of the pulsed laser 12 with respect to the CW reference laser 30, as indicated by curve 88. FIG. 2C, which depicts the instantaneous optical frequency of the pulsed laser 12 by curve 90, is obtained by taking the derivative of FIG. 2B. An appropriate time response filter is added for signal to noise improvement. Appendix A represents an implementation of the computer algorithms which processes the digitized heterodyne beat and pulsed laser intensity signal data to yield the instantaneous frequency plot. This example uses a commercially available software package called Mathgraf.

The state of the art of transient digitizer bandwidths dictates the practical upper limit of the heterodyne beat frequency. This is currently about 6 GHz. To extend the maximum allowable frequency difference between a processed pulsed laser and a CW laser, an external mixer may be used with a microwave local oscillator to down-convert the laser beat signal frequency to lie within the bandwidth of the transient digitizer, as shown in FIG. 3.

In FIG. 3, the outputs from a reference laser 102 and a pulse laser 100 are coupled in fiber coupler 106 to heterodyne detector 110. The beat signal from detector 110 is filtered through high pass filter 114 to microwave mixer 120, where the signal is mixed with the output of microwave local oscillator 116. The output of mixer 120 through 0–1 GHz amplifier 124 is then input to the transient digitizer 70 of FIG. 1.

This allows locking of the reference laser 102 to available spectral reference lines which may be at frequency offsets beyond the 6 GHz frequency limitation of the transient digitizer 70 of FIG. 1. A second advantage of this approach is related to an improvement in signal to noise arising from a source of system noise typical to tunable CW dye lasers called spurious homodyne signals. These spurious beat signals arise from intermodulation products between the low level secondary modes of the reference laser 102 and the main mode, and are therefore called homodyne signal since only the reference laser 102 is required for their generation. These signals appear with random phase in the time domain and are therefore an important source of noise on the transient digitizer input signal. Since the secondary modes fall off drastically at high frequencies offsets from the main mode, their effect may be eliminated by using a high pass filter 114 between the heterodyne detector 110 and the external microwave mixer 120.

The use of fiber-optics to couple input light to the optical detector simplifies measurements in the large laser systems typically used in AVLIS applications. Measurements may be performed at several points in a complex master oscillator, multiple amplifier laser system while using a single instrument in one location. Utilizing only one optical detector, one reference laser, one transient digitizer and time multiplexing of the optical signals under test greatly reduces system complexity. The fiber-optics allows electrical isolation of the detector, reducing many of the electromagnetic interference problems associated with recording the comparatively low signal levels from the optical detector in the immediate presence of the extremely large pulsed power waveforms required by the pulsed lasers.

Heterodyne techniques have been applied to the measurement of pulsed laser optical frequency. A pulsed laser optical frequency diagnostic system has been developed which allows comparison of the absolute laser frequency of individual laser pulses or detection of changes of laser frequency within a single laser pulse. The use of fiber-optics in this system minimizes complexity and solves many optical alignment and electromagnetic interference problems.

The foregoing description of a preferred embodiment of the invention has been presented for purposes of illustration and description. It is not intended to be exhaustive or to limit the invention to the precise form disclosed, and obviously many modifications and variations are possible in light of the above teaching. The present embodiment was chosen and described in order to best explain the principles of the invention and its practical applications to thereby enable others skilled in the art to best utilize the invention and various embodiments and with various modifications as are suited to the particular use contemplated. For example, a pulsed reference laser could be utilized where the pulsed reference laser has a longer duration than the pulse under test. Also, the pulsed test laser and pulsed reference laser should be synchronous to one another. It is intended, therefore, that the scope of the invention be defined by the claims attached hereto.

What is claimed is:

1. A laser beam frequency diagnostic system comprising:
   a first pulsed laser for generating a first short time duration pulsed laser beam having a pulse length duration of approximately 10-100 nanoseconds, the instantaneous frequency of which is to be determined,
   a second reference laser for generating a second laser beam having a predetermined frequency,
   means for heterodyning said first and second laser beams to form a beat signal representative of the difference between said first and second frequencies,
   means for processing said beat signal to determine the instantaneous frequency of said first laser beam,
   means for normalizing said beat signal,
   means for determining the relative phase between said beat signal and an assumed constant frequency average beat signal, and
   means for determining the derivative of said relative phase versus time.

2. A system as in claim 1 wherein said second reference laser is a continuous wave (CW) reference laser.

3. A system as in claim 1 wherein said second reference laser is a pulsed laser.

4. A system as in claim 1 including mixer means for converting said beat signal down to a lower frequency.

5. A system as in claim 1 including means for time multiplexing said beat signal and said pulsed laser intensity signal.

6. A laser beam frequency diagnostic system comprising:
   a first pulsed laser for generating a first short time duaration pulsed laser beam having a pulse length duration of approximately 10-100 nanoseconds, the instantaneous frequency of which is to be determined,
   a second continuous wave (CW) reference laser for generating a second laser beam having a predetermined frequency,
   means for heterodyning said first and second laser beams to form a beat signal representative of the difference between said first and second frequencies, and
   means for processing said beat signal to determine the instantaneous frequency of said first laser beam,
   means for normalizing said beat signal,
   means for determining the relative phase between said beat signal and an assumed constant frequency average beat signal, and
   means for determining the derivative of said relative phase versus time.

7. A laser beam frequency diagnostic system for determining the instantaneous frequency of a short time duration pulsed laser beam having a pulse length duration of approximately 10-100 nanoseconds, said system comprising:
   a continuous wave (CW) reference laser for generating a CW laser beam having a predetermined frequency,
   means for heterodyning said pulsed laser beam and said CW laser beam to form a beat signal representative of the difference between said first and second frequencies,
   means for processing said beat signal to determine the instantaneous frequency of said first laser beam,
   means for normalizing said beat signal,
   means for determining the relative phase between said beat signal and an assumed constant frequency average beat signal, and
   means for determing the derivative of said relative phase versus time.

8. In a laser beam frequency diagnostic system, the method comprising the steps of:
   generating a first short time duration pulsed laser beam having a pulse length duration of approximately 10-100 nanoseconds, the instantaneous frequency of which is to be determined,
   generating a second continuous laser beam having a predetermined frequency,
   heterodyning said first and second laser beams to form a beat signal representative of the difference between said first and second frequencies,
   processing said beat signal to determine the instantaneous frequency of said first laser beam, including the steps of
   normalizing said beat signal,
   determining the relative phase between said beat signal and an assumed constant frequency average beat signal, and
   determining the relative of said relative phase versus time.

* * * * *